United States Patent [19]
Brynsvold et al.

[11] 3,964,969
[45] June 22, 1976

[54] INTERNAL CORE TIGHTENER

[75] Inventors: Glen V. Brynsvold, San Jose; Harold J. Snyder, Jr., Rancho Santa Fe, both of Calif.

[73] Assignee: The United States of America as represented by the United States Energy Research and Development Administration, Washington, D.C.

[22] Filed: June 20, 1974

[21] Appl. No.: 481,299

[52] U.S. Cl. .................................. 176/87; 176/40
[51] Int. Cl.² ........................................... G21C 5/08
[58] Field of Search .................. 176/19, 30, 34, 33, 176/86, 76, 87, 40, 85; 294/86.25, 86.24, 94, 96

[56] References Cited
UNITED STATES PATENTS

| | | | |
|---|---|---|---|
| 2,719,051 | 9/1955 | Hankins | 294/96 |
| 2,953,406 | 9/1960 | Young | 294/86.25 |
| 3,091,290 | 5/1963 | Clark | 294/86.25 |
| 3,549,491 | 12/1970 | Johnson | 176/87 |
| 3,726,761 | 4/1973 | Thorel et al. | 176/87 |

Primary Examiner—Samuel W. Engle
Assistant Examiner—S. A. Cangialosi
Attorney, Agent, or Firm—Dean E. Carlson; F. A. Robertson; L. E. Carnahan

[57] ABSTRACT

An internal core tightener which is a linear actuated (vertical actuation motion) expanding device utilizing a minimum of moving parts to perform the lateral tightening function. The key features are: (1) large contact areas to transmit loads during reactor operation; (2) actuation cam surfaces loaded only during clamping and unclamping operation; (3) separation of the parts and internal operation involved in the holding function from those involved in the actuation function; and (4) preloaded pads with compliant travel at each face of the hexagonal assembly at the two clamping planes to accommodate thermal expansion and irradiation induced swelling. The latter feature enables use of a "fixed" outer core boundary, and thus eliminates the uncertainty in gross core dimensions, and potential for rapid core reactivity changes as a result of core dimensional change.

5 Claims, 12 Drawing Figures

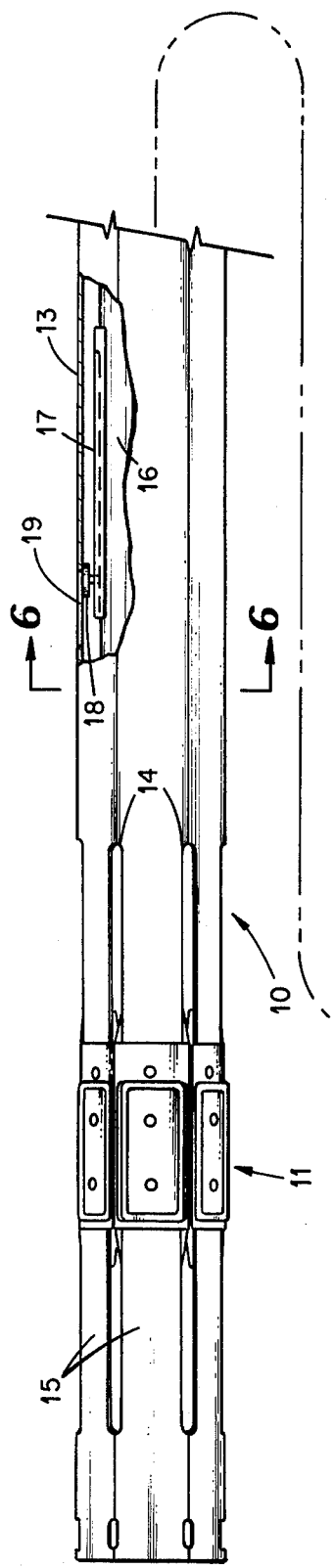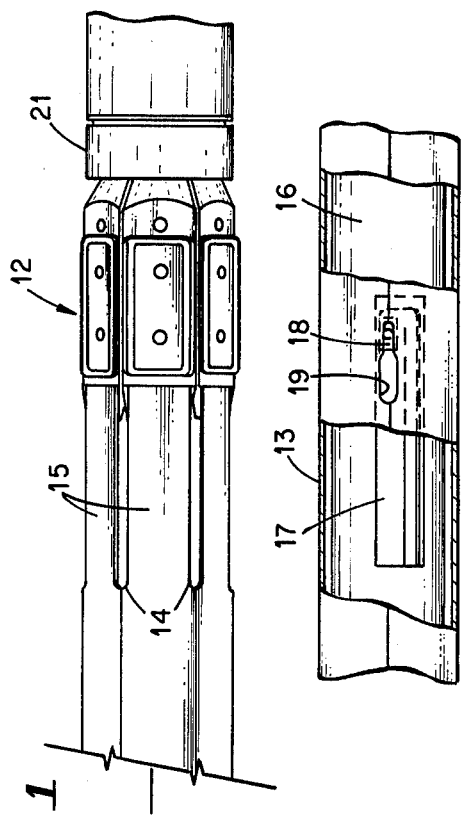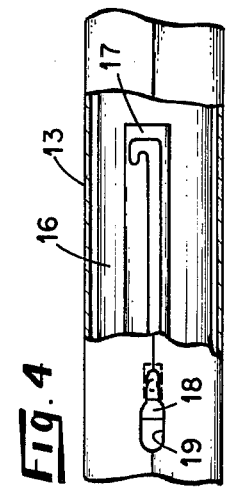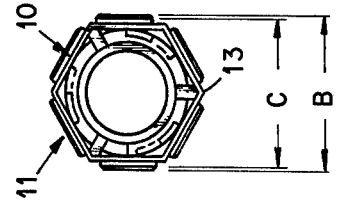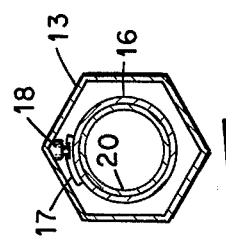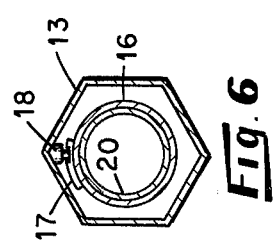

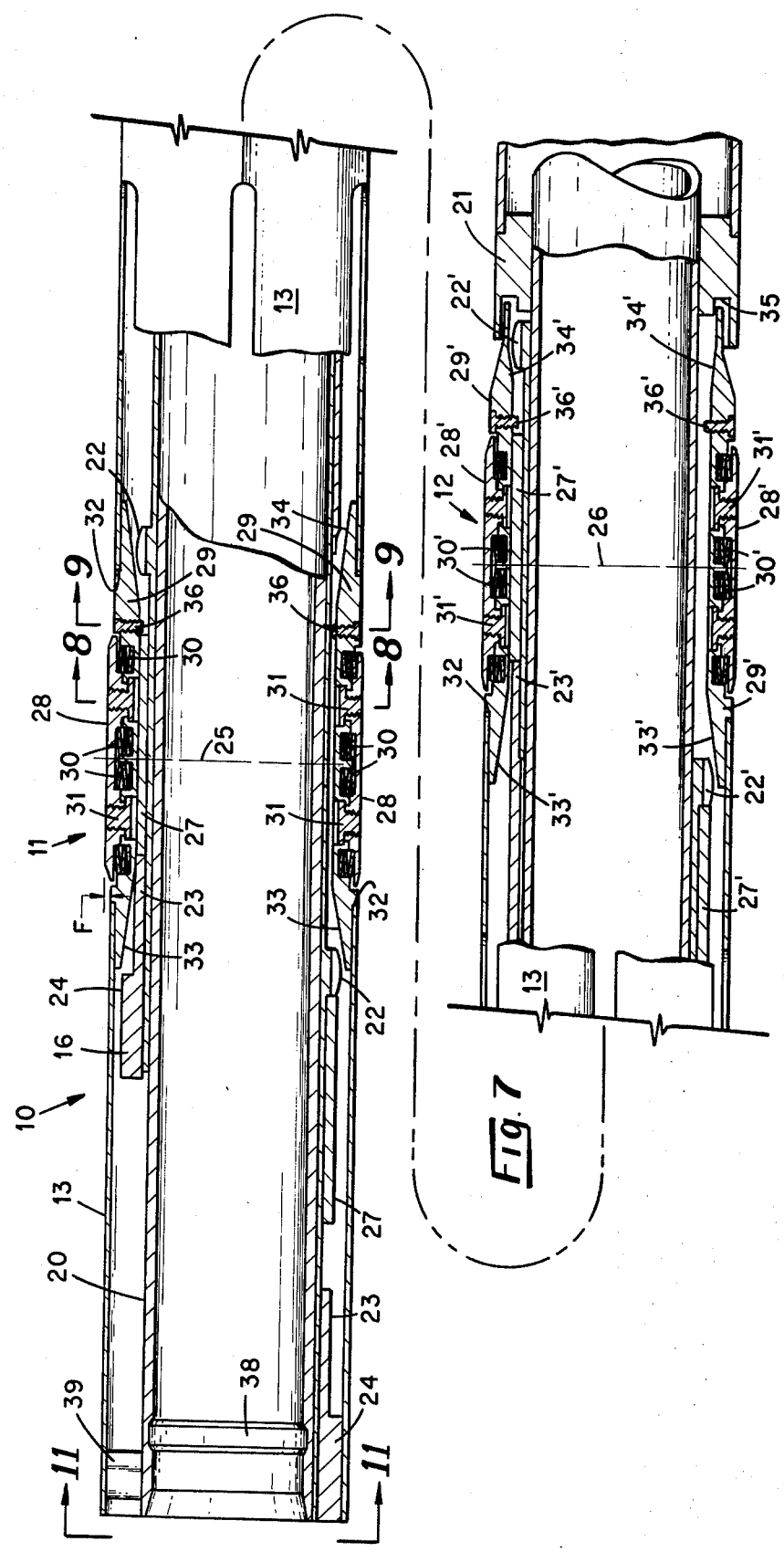

INTERNAL CORE TIGHTENER

BACKGROUND OF THE INVENTION

The invention described herein was made in the course of, or under, Contract No. AT(04-3)-830, with the United States Atomic Energy Commission.

Liquid metal cooled, fast breeder reactors (LMFBR) designed for commercial power generation or as large test reactors have several unique characteristics associated with the reactor core. As a result, special attention must be given to the structure that supports and retains the core components. For example, one problem is the material swelling and creep induced by the high fluence (neutron flux × time) associated with economically acceptable fuel burnup. This swelling and creep results in the deformation of fuel assemblies and the introduction of restraint loads necessary to maintain fuel assembly lateral positioning. The positioning is very important since a characteristic of large fast reactor cores is the sensitivity of nuclear reactivity to small geometric changes in core configuration (typically $4 reactivity increase for a 1 inch radius reduction). This results in the necessity for tight geometric control of core configuration and yet be able to accommodate irradiation induced swelling in addition to the normal thermal expansion.

Several basic concepts can be envisioned that could perform this function. In general, these concepts involve constraint mechanisms and some form of compliance or flexibility to accommodate normal distortions without excessive restraint on the components. One of these concepts consists of a fixed external boundary located at several elevations near the core and the use of an internal tightening device, located at a number of the core flow channels, that removes the clearance necessary in the refueling process. Compliance can be provided by spring devices located on the periphery of the core and blanket assemblies and within the fixed boundaries. Alternately, compliance can be provided locally on each of the tightener assemblies located throughout the core and blanket. The use of internal tightener compliance has an advantage in that the accidental release of possible core disarrangement caused by ratcheting of the channels at the clamping planes will not cause a decrease in core radius and thus will not introduce positive reactivity. This is a potential safety feature in the use of internal compliance.

SUMMARY OF THE INVENTION

The present invention is directed to an apparatus that provides the basic function of internal tightening and provides for local compliance. The primary features of the apparatus include large contact areas to transmit loads during reactor operation, actuation cam surfaces loaded only during clamping and unclamping operations, and preloaded pads with compliant travel at each face of the hexagonal assembly at each clamping plane to accommodate thermal expansion and irradiation induced swelling.

Therefore, it is an object of the invention to provide a device that accomplishes the basic function of internal tightening and provides for local compliance in the core of a liquid metal cooled, fast breeder reactor.

A further object of the invention is to provide an internal core tightener for an LMFBR which is a linear actuated expanding device using a minimum of moving parts to perform the lateral tightening function.

Another object of the invention is to provide an internal core tightener for an LMFBR which utilizes large contact areas to transmit loads, actuation cam surfaces loading only during certain operations, and preloaded pads with compliant travel to accommodate thermal expansion and irradiation induced swelling.

BRIEF DESCRIPTION OF THE DRAWINGS

FIG. 1 is an external view, with a central portion cut-away, illustrating an embodiment of the invention;

FIGS. 2 and 3 are end views of the FIG. 1 embodiment illustrating the cross-section thereof in the respective unclamped and clamped positions;

FIGS. 4 and 5 are view of the cut-away portion of the FIG. 1 embodiment showing the actuation sleeve guidance and latch arrangement in the respective up and down positions;

FIG. 6 is a cross-sectional view of the FIG. 1 embodiment taken along the lines C—C of FIG. 1;

FIG. 7 is an enlarged, partial cross-sectional view of FIG. 1 embodiment with the central section omitted, and with the upper half illustrated in the clamped position and the lower half illustrated in the unclamped position;

DESCRIPTION OF THE INVENTION

Broadly, the invention is directed to an internal core tightener for fuel elements of a nuclear reactor and is a linear actuated expanding device which uses a minimum of moving parts to perform the lateral tightening function. The key features include: (1) large contact areas to transmit loads during reactor operation, (2) actuation cam surfaces loaded only during clamping and unclamping operations, and (3) preloaded pads with compliant travel at each face of the hexagonal assembly at each clamping plane to accommodate thermal expansion and irradiation induced swelling. This last feature enables use of a "fixed" outer core boundary, and thus eliminates the uncertainty in gross core dimensions, and potential for rapid core reactivity changes as a result of core dimensional change.

Figure 8:
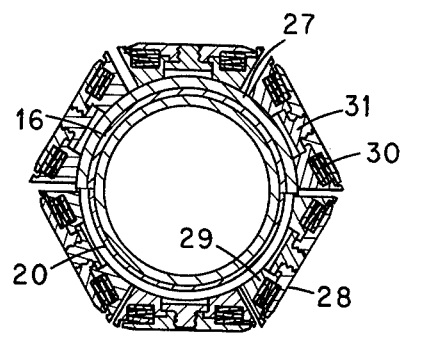
FIGS. 8 and 9 are views taken on the lines A—A and B—B, respectively, of FIG. 7.
Figure 9:
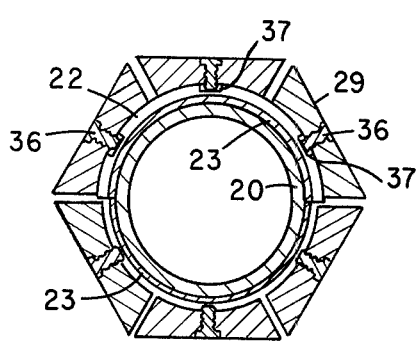
Figure 10:
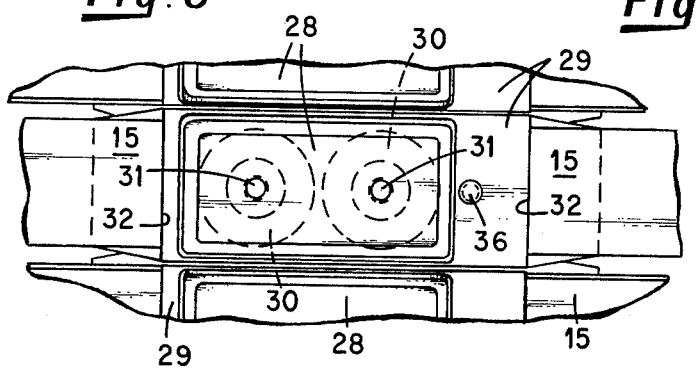
FIG. 10 is a partial external view of the FIG. 7 apparatus illustrating the load pad section thereof.

Referring now to the embodiment of the invention, illustrated in the drawings, FIGS. 1–6 are shown at approximately one-half the scale of FIGS. 7–12. The upper half of FIGS. 7–9 are illustrated in the clamped position while the lower half is illustrated in the unclamped position, whereby certain components in the lower half are shown as being located a distance to the left of the location of the same component in the upper half of each of FIG. 7 and having different cross-sections when viewed in FIGS. 8 and 9.

As shown in FIG. 1, an element 10 for a nuclear reactor, such as used in a liquid metal fast breeder reactor, either as a fuel assembly or control assembly, incorporates load pad assemblies indicated generally at 11 and 12 at two spaced clamping planes along the length of element 10, as will be described in greater detail hereinafter. Element 10 includes an outer casing or wrapper 13, hexagonal in configuration, the corners of which are machined out in the vicinity of the load pad assemblies 11 and 12 as indicated at 14, leaving only the relatively flexible flat sides 15 of casing 13 as support members for the load pad assemblies. Load pad assemblies 11 and 12 are moved radially outward during the clamping operation, for example, from an unclamped cross-section distance indicated at A in FIG. 2 of 3.959 inches to be clamped cross-section distance indicated at B in FIG. 3 is 4.134 inches. FIG. 3 illustrates at C the cross-section distance of 4.074 inches, for example, across the load pad assemblies 11 and 12 after compliance travel (the inward movement due to thermal expansion and irradiation induced swelling of the adjacent similar elements positioned about element 10). Thus, the radial outward distance from unclamped to clamped and with compliance travel may vary from about 0.088 to 0.058 inches, the average being about 0.073 inches in the embodiment illustrated. The length of element 10, for example, is 60 inches.

FIGS. 4–6 show an actuation sleeve guidance and latch arrangement located in the central portion of element 10 which functions to latch or secure an actuation sleeve 16 to external casing 13. As shown a guide member 17, having a U-shaped grooved portion with one leg of the U substantially longer than the other leg, is fixedly attached to sleeve 16 and a latch member 18 is attached to casing 13 adjacent an opening 19 therein. Movement of actuation sleeve 16 with respect to casing 13 causes latch member 18 to travel along the long leg of the groove of guide member 17 to the bottom of the U whereupon a turning motion of actuation sleeve 16 moves latch member 18 through the bottom of the U whereby a reverse motion of the sleeve 16 locks the latch member 18 in the short leg of the U shaped groove of guide 17.

Element 10 and load pad assemblies 11 and 12 are illustrated in detail in FIGS. 7–10. Inasmuch as load pad assemblies 11 and 12 are substantially identical, only assembly 11 will be described in detail with similar components of assembly 12 being given corresponding reference numerals. As noted above, the central section of element 10 has been omitted in FIG. 7 for clarity. Again, it is pointed out that the lower half of each of FIGS. 7–9 as illustrated in the unclamped position with the upper half shown in the clamped position, thus accounting for the different locations of certain of the components in the upper and lower halves of each Figure.

As seen in FIG. 7, element 10 is provided with a longitudinally extending support tube 20 which extends outwardly from the right hand end of casing 13 and into a lower tube fitting 21, load pad assembly 12 being positioned intermediate the right terminal end of casing 13 and lower tube fitting 21. Actuation sleeve 16 is positioned about support tube 20 and is provided with two operating sections, one of which is constructed to cooperate with load pad assembly 11 and the other with load pad assembly 12. Actuation sleeve is provided in the area of load pad assembly 11 with a cam-like section or member 22 located in spaced relation with a shoulder-forming member or section 23 having an enlarged end section 24, with another cam-like section 22' and shoulder-forming member 23' positioned to cooperate with load pad assembly 12. Load pad assembly 11 is located in an upper clamping plane indicated at 25, positioned in this embodiment at 127.5 inches above the core support top, not shown, while load pad assembly 12 is located in a lower clamping plane indicated at 26, positioned at 85 inches above the core support top, there being a difference, in this embodiment, of 42.5 inches between planes 25 and 26 which pass through the center of assemblies 211 and 12. Positioned about actuation sleeve 16 intermediate cam-like section 22 and shoulder-forming member 23 is a load collar 27 which is moved by sleeve 16 from the unclamped position to the clamped position where collar 27 is located intermediate load pad assembly 11 and sleeve 16 holding load pad assembly 11 outwardly into the clamped position as shown in the upper half of FIGS. 7 and 8, as discussed in more detail hereafter.

Load pad assembly 11 is composed of six identical subassemblies positioned about hexagonal outer casing 13 on the relatively flexible flat sides 15 as described above with respect to FIG. 1. Each sub-assembly is composed of a load pad 28, a load pad support 29, a pair of resilient members 30, such as belleville spring washers, and a pair of threaded members 31 which are threaded into threaded apertures in load pad 28 with heads thereof abutting against flanges on load pad support 29, and function to adjustably retain resilient members 30 intermediate load pad 28 and load pad support 19. Load pad support 29 is provided on the external side thereof with shoulder forming sections which abut against the ends of casing sides 15, as indicated at 32, portions of casing sides 15 having been cut-away to accommodate load pad assembly 11. The inner end portions of each load pad support 29 are provided with tapered surfaces 33 and 34 which cooperate with cam 22 of actuation sleeve 16 for moving load pad assembly 11 from the unclamped to clamped position and return to the unclamped position, as will be described in greater detail hereinafter. As pointed out above, load pad assembly 12 is generally similar to assembly 11, the difference being in the external configuration of load pad supports 29' which are constructed to extend into an annular space 35 provided in the lower tube fitting 21. A load collar positioning pin 36 is threaded through each of load pad support 29 and serves as a stop for load collar 27 when it is moved toward the right hand side as shown in the upper half of FIG. 7 by actuation sleeve 16. To allow movement of cam 22 past pins 36, the cam is provided with a plurality of grooves 37, see FIG. 9, through which pins 36 pass as actuation sleeve 16 is moved.

Figure 11:
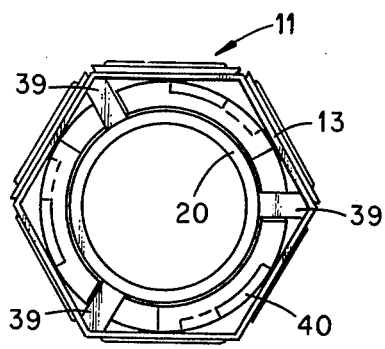
FIG. 11 is an end view of the FIG. 7 apparatus.
Figure 12:
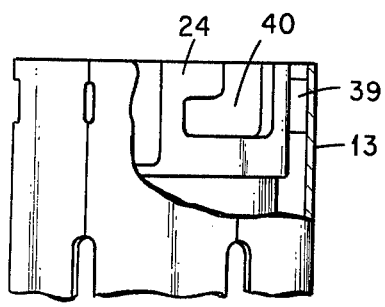
FIG. 12 is a partial side view of the end portion of the FIG. 7 apparatus with a section thereof cut-away.

The internal support tube 20 in addition to serving as a locating structure for the other components and as a guide for actuation sleeve 16, serves as a control rod guide tube in the case where the element 10 is affixed to a control assembly. An upper end fitting 38 secured to support tube 20 serves as a handle for the entire assembly. A final fabrication operation joins the upper ends (left hand ends) of the support tube 20 and outer wrapper of casing 13 by the installation of support lugs 39, three such lugs being used in this embodiment as shown in FIG. 11. This action also captures or retains actuation sleeve 26 and load collar 27 between casing 13 and support tube 20. As shown in FIGS. 11 and 12, enlarged end section 24 of actuation sleeve 16, is provided with actuator tool engagement receptacles 40 (three shown in this embodiment), whereby an actuation tool can be inserted for movement of actuation sleeve 16 from the unclamped position to the clamped position which moves load pad assemblies 11 and 12 outwardly with respect to casing 13.

The dual objective of having a "rigid" component for clamping alignment purposes and a "flexible" component for accommodating expansion is met by the preloaded load pad assemblies 11 and 12. Preload force (~1000 pounds in this case) is provided by the belleville spring washers 30 in each of the sub-assemblies of load pad assemblies 11 and 12. This force is significantly greater than that necessary to constrain adjacent bowed fuel assemblies and therefore enables accurate "rigid element" positioning during clamping and unclamping operations. For example, due to the radial outward movement of load pad assemblies 11 and 12 by actuation sleeve 16, the assemblies are moved outwardly 0.088 inch. Forces due to thermal expansion and irradiation induced swelling during reactor operation overcome the preload force of spring washers 30. This enables localized accommodation for these dimensional changes (0.030 inch compliant or spring travel, as indicated at E in FIG. 7, for each load pad 28, for example) within a predictable load range (from 1000 pounds to 1300 pounds, for example) and yet does not involve overall radial core growth. The remaining 0.058 inch, indicated at F in FIG. 7, of the outward 0.088 inch movement of load pad assemblies 11 and 12 is maintained by actuation sleeve 16 and load collar 27.

The clamping operation of the above-described internal core tightener is accomplished by moving actuation sleeve 16 axially from its position shown in the lower half to the position shown in the upper half of FIG. 7 causing cam 22 to engage the tapered ends 33 of load pad supports 29 moving load pad assembly 11 outward as cam 22 passes along in inner surface of load pad supports 29. Cam 22, being a few mils larger in diameter than load collar 27, forces the load pad assembly 11 outwardly sufficient distance to allow for relatively easy movement of the load collar 27, being moved by shoulder-forming member 23 of actuation sleeve, to the position beneath load pad supports 29, further movement of load collar 27 being stopped by load collar positioning pins 36. Thus, during clamping operation, the load collar 27 moves into position between member 23 and pins 36 to take the reaction loads of the load pad assembly 11 as the cam 22 is moved past load pad supports 29 to an unloaded condition as shown in the upper half of FIG. 7. While the above description has been directed to load pad assembly 11, load pad assembly 12 is simultaneously actuated in the same manner. Unclamping operation is accomplished by reverse movement of actuation sleeve 16 causing load collars 27 and 27' to be withdrawn by cams 22 and 22' to the position shown in the lower half of FIG. 7.

Actuation forces are minimized since the cam action surfaces (cam 22 and load pad support inner surfaces) are in contact only during actuation. This reduces the frictional drag problem to sliding friction rather than static friction which would be significantly greater.

Generous clearances are provided between all moving parts except the cam-to-load pad support surface during actuation and load collar-to-load pad support surface during reactor operation. Furthermore, the actuating cams 22, being slightly larger in diameter than the load collars 27, separate to the contacting surfaces (which have sustained high loads at operating conditions) before the load collars are retracted. This provides a "pry-apart" action before the load collars are moved.

Large contact area is provided between the load collars and inner load pad support surfaces. The resultant low contact stress minimizes the break-away forces for unclamping since the potential is diminished for occurrence of the phenomenon known as "self-welding" (brought about in the reactor environment by high bearing loads and high temperature).

Load bearing components are relatively small. This allows great freedom in material and/or special surface coating selection to minimize friction and self-welding.

The provision of internal compliance via the spring load pad assemblies enables use of a rigid core boundary during reactor operation. Any rapid changes related to the internal compliance restraint system can only cause localized movement of core components and thus has negligible effect on gross core neutronics.

The primary function for the preloaded load pad assemblies is to accommodate expansion during reactor operation. An optional application for this apparatus could be to use the compliant load pads as load limiting devices under other operating conditions such as the clamping operation. It could also provide a "staged" compliant travel by building in more than one threshold spring force such that part of the compliant travel occurs under one set of load conditions and another part of the compliant travel occurs under greatly differing load conditions. A further variation of the compliant travel behavior would be to use variable spring characteristics (and thus applied force variation) as a function of temperature, i.e., lower load limits at elevated temperature.

Another option for the above-described apparatus is to use any part thereof to fulfill a more limited requirement. Some examples of this are: (1) non-compliant load pad assemblies if rigid clamping were the requirement, (2) compliant load pad assemblies only if expanding action were not a requirement, and (3) different quantity of clamp pads or different location of clamping action.

It has thus been shown the the present invention provides an internal core tightener which uses a minimum of moving parts to perform the lateral tightening function, thus substantially advancing the start-of-the-art.

While a particular embodiment of the invention has been illustrated and described, modifications will become apparent to those skilled in the art, and it is intended to cover in the appended claims all such modifications as come within the spirit and scope of the invention.

What we claim is:

1. In a nuclear reactor utilizing a core composed of a plurality of closely adjacent fuel and control elements each having an outer casing and a spaced internal support tube; at least one internal core tightener for clamping adjacent elements comprising: an actuation sleeve positioned intermediate said support tube and said outer casing, said actuation sleeve being provided with at least one protruding cam-like member and at least one shoulder-forming member, said shoulder-forming member being located in spaced longitudinal relationship with said cam-like member, a load collar positioned about asid actuation sleeve intermediate said cam-like member and said shoulder-forming member thereof, and a plurality of preloaded load pad assemblies operatively positioned in openings in said outer casing, wherein axial movement of said actuation sleeve in one direction engages said shoulder forming member with said cam-like member causing said cam-like member to engage said load pad assemblies, moving said load pad assemblies outwardly and positions said load collar intermediate said actuation sleeve and said preloaded load pad assemblies forcing portions of said preloaded load pad assemblies to a position external of said outer casing for contacting adjacent elements, and axial movement of said actuation sleeve in the opposite direction withdraws said load collar from the position intermediate said actuation sleeve and said preloaded load pad assemblies and wherein said preloaded load assemblies constitute a rigid structure for clamping alignment of the adjacent elements and a flexible structure for accommodating expansion of the adjacent elements.

2. The internal core tightener defined in claim 1, wherein said plurality of preloaded load pad assemblies comprises: a load pad, a load pad support, at least one resilient member, and means for retaining said resilient member intermediate said load pad and said load pad support, said load pad support being operably positioned in one of said openings in said outer casing for retaining said preloaded load pad assembly therein, said load pad support having an inner surface configured to cooperate with said cam-like member of said actuation sleeve and said load collar.

3. The internal core tightener defined in claim 2, wherein said resilient member comprises a belleville spring washer.

4. The internal core tightener defined in claim 1, additionally including positioning pin means for said load collar.

5. The internal core tightener defined in claim 4, wherein said positioning pin means comprises a threaded pin adjustably mounted in each of said preloaded load pad assemblies.

* * * * *